Aug. 19, 1958 G. H. ROTHER ET AL 2,848,615

FREQUENCY CONTROL SYSTEM

Filed May 21, 1956

INVENTORS
JOSEPH E. SLAWEK, SR.
GEORGE H. ROTHER

BY

ATTORNEY

United States Patent Office 2,848,615

Patented Aug. 19, 1958

2,848,615

FREQUENCY CONTROL SYSTEM

George H. Rother and Joseph E. Slawek, Sr., Philadelphia, Pa., assignors to Philco Corporation, Philadelphia, Pa., a corporation of Pennsylvania Application May 21, 1956, Serial No. 586,240

12 Claims. (Cl. 250—36)

The present invention relates to frequency control systems and more particularly to systems for maintaining a fixed frequency separation between signals from two different sources.

Many forms of electronic systems employ two or more tunable oscillators or signal generators which must operate with a fixed frequency separation between the signals generated thereby. For example, several radar systems currently in use employ magnetrons which are tunable over a frequency band of 100 megacycles or more. One typical magnetron will tune from 1220 to 1340 megacycles. The tuning of the magnetron may be changed from time to time either automatically or under the control of the operator in order to avoid interfering signals or otherwise improve the reception of object reflected echo signals. Since the intermediate frequency system of the radar receiver is usually fixed at approximately 60 megacycles, it follows that some means must be provided for changing the frequency of the local oscillator over a band at least as great as the tuning band of the magnetron. In the example given above, the local oscillator might be tunable from 1280 to 1400 megacycles. In order to simplify the operation of the radar system a simple servo system is usually provided for controlling the frequency of the local oscillator signal automatically as the frequency of the magnetron is changed. One form of automatic frequency control currently in use includes means for sweeping the frequency of the local oscillator signal over the selected tuning range—in the example given above over the range from 1280 to 1400 megacycles. A circuit comprising a heterodyne mixer, an intermediate frequency amplifier and a discriminator connected in cascade is provided for interrupting the frequency sweep when the proper local oscillator frequency is reached. A sample of the transmitted signal and a sample of the local oscillator are supplied to the heterodyne mixer. The crossover frequency of the discriminator is set to the desired frequency difference, in this example 60 megacycles. Signals of one polarity from the discriminator will permit the frequency sweep to continue while signals of the opposite polarity will interrupt the sweep. Thus the local oscillator will sweep in frequency until the heterodyne signal reaching the discriminator has a frequency equal to the desired crossover frequency. At this point the sweeping of the local oscillator frequency is stopped and the radar system operates as if both the local oscillator and the transmitting oscillator were fixed tuned circuits. If the frequency of the transmitting oscillator is charged, the local oscillator is again caused to sweep in frequency until the proper local oscillator frequency is re-established.

As suggested above, systems for accomplishing the above are well known in the art and are now in current use. Examples of systems of this type are to be found in U. S. Patents 2,562,304 to Durand et al., and 2,627,024 to Bell. It has been found, however, that systems of this general type suffer from a rather serious disadvantage. In the heterodyning of the local oscillator signal with the sample of the transmitted signal a second harmonic of the desired beat signal is developed. If the frequency of the local oscillator is such that the separation between the frequency of the local oscillator signal and the frequency of the transmitted signal is only one-half the desired value, the second harmonic of the beat frequency in the frequency control circuit will be exactly equal to the desired value. However, the intermediate frequency in the receiver proper will be at only one-half the desired value. For example, if the transmitting oscillator is set at 1300 megacycles and the frequency of the local oscillator reaches 1330 megacycles, only 30 megacycles away from the frequency of the transmitting oscillator, a heterodyne signal of 30 megacycles is developed in the mixer of the automatic frequency control circuit. This signal will not be passed by the intermediate frequency amplifier which usually follows the mixer. However, at the same time the 30 megacycle signal is being generated, a second harmonic of the 30 megacycle signal is also generated. This second harmonic has a frequency of $2\times30$ megacycles or 60 megacycles. A 60 megacycle signal may also be developed from the heterodyning of the second harmonic of the signal from the transmitting oscillator with the second harmonic of the signal from the local oscillator. In the illustrative example given above these 60 megacycle signals will be passed by the intermediate frequency amplifier and will generate a signal at the output of the discriminator. If the signal at the output of the discriminator is of sufficient amplitude, it will stop the sweep of the local oscillator at 1330 megacycles instead of permitting it to continue to sweep to the proper value of 1360 megacycles where it would be interrupted by the 60 megacycle fundamental beat frequency signal.

It should be noted that this undesired second harmonic signal in the frequency control circuit cannot be eliminated by employing a balanced mixer or a band rejection filter tuned to the second harmonic frequency because, under the conditions described above, the unwanted second harmonic is at exactly the frequency to which the mixer and the discriminator should respond.

The means frequently employed to overcome the difficulty outlined above is to provide a potentiometer for controlling the gain of the I. F. amplifier which connects the mixer to the discriminator in the frequency control circuit. This potentiometer is set so that the fundamental or desired beat frequency signal which results from the heterodyning of the sample of the signal from one oscillator with the signal from the other oscillator produces an error signal at the output of the discriminator which has an amplitude just sufficient to stabilize the frequency of the local oscillator. The operation of this circuit depends upon the assumption that the amplitude of the second harmonic signal will normally be less than the amplitude of the fundamental beat frequency signal. To continue the example given above, the operation is based on the assumption that the second harmonic of the 30 megacycle signal generated when the local oscillator signal has a frequency of 1330 megacycles will have an amplitude which is less than the amplitude of the 60 megacycle beat signal generated when the local oscillator has a frequency of 1360 megacycles. If the assumption is correct and if the circuit is properly adjusted, the frequency control circuit will not respond to the second harmonic signal. However, many factors affect the amplitude of both the desired beat frequency signal and the second harmonic of one-half the desired beat frequency. These factors include the ratio of signal to local oscillator injection voltage, the termination impedances for the various signals and voltage standing wave ratios in the mixer circuit. Therefore the potentiometer adjustment is an extremely critical one and one which must be changed frequently to compensate for the effects of tube aging or replacement and other factors affecting the operation of the frequency control system.

In the explanation given above frequent reference has been made to frequency control system for radar systems. It should be understood, however, that this is only by way of example and that similar problems are encountered in frequency control systems serving other types of circuits.

Therefore it is an object of the present invention to provide a novel circuit which provides an output signal only when two input signals supplied thereto differ in frequency by a selected amount.

Another object of the present invention is to provide an improved circuit for maintaining a fixed separation between the frequencies of two signals.

It is a further object of the present invention to provide a simple circuit for minimizing the effect of second harmonic signals in wide band frequency control systems.

Still another object of the invention is to provide a frequency responsive circuit which is insensitive to the second harmonic of half the desired frequency of operation.

In general these and other objects of the present invention are accomplished by providing in the frequency control system, at a position intermediate the heterodyne mixer and the means for controlling the frequency of the oscillator, a bandpass amplifier system having an overall gain at approximately the desired difference frequency which is a function of the subharmonic content of the signal at the output of the heterodyne mixer, the gain of said amplifier system being lower in the presence of a signal having a frequency equal to one-half the desired difference frequency than it is in the absence of such a signal.

For a better understanding of the invention together with other and further objects thereof reference should now be made to the following detailed description which is to be read in conjunction with the accompanying drawings in which.

Figure 1:
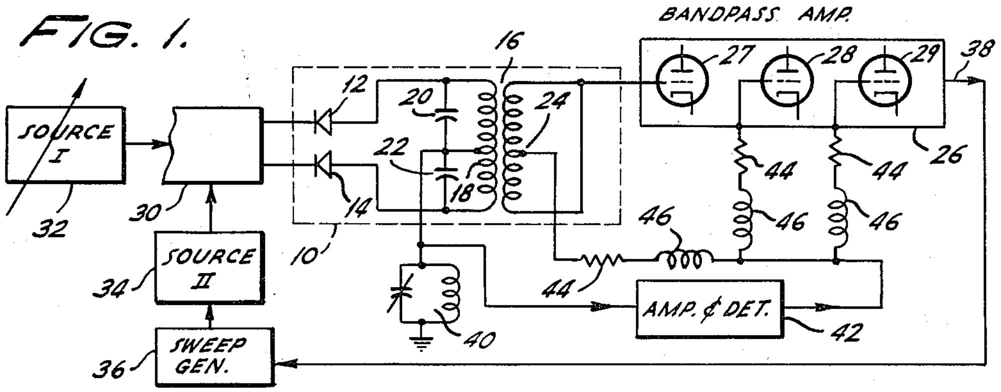
Fig. 1 is a diagram partly in block form of one preferred embodiment of the present invention.

Turning now to Fig. 1, the invention comprises a mixer circuit 10, here shown as a balanced mixer including diode elements 12 and 14 and a transformer 16. The primary winding 18 of transformer 16 is tuned to resonance at a desired intermediate frequency by means of capacitors 20 and 22. Capacitors 20 and 22 are each connected between one end terminal of winding 18 and a center tap of this winding. A secondary winding 24 of transformer 16 is provided for obtaining an output signal from the mixer 10. Secondary winding 24 is center tapped and the two halves of the winding are so phased that the end terminals are at the same instantaneous potential with respect to the center tap. Therefore the two end terminals may be connected together as shown in Fig. 1 and connected to the input of bandpass amplifier strip 26. Bandpass amplifier strip 26 may have only a single stage or it may have many stages. Three stages are assumed in the description which follows. These stages are represented by the symbols 27, 28 and 29 which represent the electron tubes normally employed in such stages. As shown in Fig. 1, secondary winding 24 is connected to the control grid of the first stage 27. The connections to the other stages will be explained presently. Since stages 27, 28 and 29 are not necessarily consecutive stages, the connections between the various stages are not shown in Fig. 1. However, these connections may be of the type usually employed in intermediate frequency amplifier design and may include one or more additional amplifier stages if desired.

Mixer 10 is supplied with signals at two frequencies by a waveguide or other suitable signal transmission means 30. These signals are supplied to transmission means 30 from two sources 32 and 34. Source 32 may have a relatively fixed frequency subject only to thermal drift or the like or the frequency of this source may be adjustable over a relatively wide range. Source 34 is so arranged that the frequency of the signal supplied thereby may be varied over a range at least as great as the possible variation in frequency of the signal from source 32. In addition, the range of frequency of source 34 is such that a frequency difference equal to the center frequency of operation of amplifier 26 may be maintained between the signals from sources 32 and 34. It is also assumed that, owing to the variation in frequency of the signal from either source 32 or source 34, the difference between the frequencies of operation of sources 32 and 34 may be equal to or less than one-half the operating frequency of amplifier 26 at some time during the operation of the system. The exact nature of sources 32 and 34 is not important to the present invention. However, by way of example, they may be the transmitting oscillator and local oscillator, respectively, of a radar system. Block 36 represents a circuit for causing the frequency of the signal from source 34 to vary periodically over a preselected band in the absence of a selected signal from output connection 38 of amplifier 26 and to remain fixed in frequency upon receipt of this signal. The means for controlling the frequency may be an electromechanical or a thermo-mechanical means for changing the tuning of a cavity resonator in oscillator 34 or it may be means for applying a suitable electrical signal to a frequency control electrode of oscillator 34. It is assumed that the discriminator or equivalent frequency sensitive element which responds to the signal from amplifier 26 is included in block 36.

A tuned circuit 40 is connected to the center tap of primary winding 18 in mixer 10. Winding 40 is tuned to a frequency equal to one-half the center frequency of the passband of amplifier 26.

The ungrounded side of tuned circuit 40 is connected to the input of an amplifier detector circuit 42. The circuit represented by block 42 is a bandpass amplifier followed by a detector circuit. The passband of amplifier 42 includes the frequency to which circuit 40 is tuned. Thus the circuit represented by block 42 will provide a direct current output signal the amplitude of which is a function of the amplitude of the oscillatory signal supplied by circuit 40. The direct current signal appearing at the output of amplifier-detecter circuit 42 is supplied as a gain control bias signal to one or more stages of bandpass amplifier 26. In the circuit shown in Fig. 1 this bias signal is supplied to the three stages 27, 28 and 29. Supplying the signal to more than one stage of amplifier 26 gives a more positive control of the gain of this amplifier than is the case if the signal is supplied to only one stage. However, it lies within the scope of the present invention to apply the bias signal to one stage, two stages or more than three stages of amplifier 26 as desired. The resistors 44 and the inductors 46 shown in Fig. 1 form decoupling circuits which prevent feedback between the several stages in bandpass amplifier 26.

The function of the circuit of Fig. 1 is to provide an output signal at connection 38 when the operating frequencies of sources 32 and 34 differ by exactly the operating frequency of bandpass amplifier 26. The frequency to which amplifier 26 is tuned is referred to hereinafter as the desired difference frequency. If sources 32 and 34 differ in frequency by exactly the operating frequency of bandpass amplifier 26, no problem arises. The signals at the output of mixer 10 will comprise a signal at a frequency which will be passed by bandpass amplifier 26. It will also contain harmonics of this frequency. However, the harmonics lie above the band that will be passed by amplifier 26 and hence are excluded from output 38 by the bandpass characteristic of amplifier 26. Suppose, however, that the frequencies of the signals supplied by sources 32 and 34 differ by only one-half the desired amount. In the absence of circuits 40 and 42 the circuit of Fig. 1 would operate in the following manner. A beat frequency signal will appear at the output of mixer 10 which is at one-half the operating frequency of bandpass amplifier 26. This signal will not be passed by amplifier 26 because it lies outside the passband of this circuit. However, the second harmonic of this first-mentioned frequency will also appear at the output of mixer 10. This second harmonic will be at a frequency which would be passed by amplifier 26 and hence would cause a signal to appear at output 38. The signal at output 38 would provide the erroneous indication that the frequencies of operation of sources 32 and 34 were separated by the desired amount. This erroneous signal would cause circuit 36 to interrupt the sweep of oscillator 34. In the circuit of the present invention this erroneous signal is prevented from appearing at output 38 by the action of circuits 40 and 42. When the operating frequencies of sources 32 and 34 are separated by one-half the desired difference frequency, the one-half difference frequency appearing in mixer 10 will develop a signal of substantial amplitude across tuned circuit 40. This signal is supplied to the input of amplifier detector 42. As mentioned before, circuit 42 provides an output signal which is proportional to the amplitude of the oscillatory signal supplied to its input. This D. C. signal appearing at the output of circuit 42 is applied as a gain control bias signal to the stages in amplifier 26. The circuit is so arranged that a bias signal supplied by amplifier detector circuit 42 to amplifier circuit 26 decreases the gain of the stages in amplifier 26. The circuit constants may be so selected that the gain is reduced to zero, thereby making amplifier 26 inoperative to pass a signal. Therefore, when sources 32 and 34 are sperated by the one-half difference frequency, amplifier detector circuit 42 will act to decrease the overall gain of bandpass amplifier 26. Under these conditions, the signal appearing at output 38 in response to the second harmonic of one-half the desired difference frequency will be much smaller in amplitude than the signal appearing at output 38 when the signal from sources 32 and 34 are separated by the desired difference frequency. It should be noted that amplifier detector circuit 42 will have no appreciable effect at the desired difference frequency for the reason that the desired difference signal and harmonics thereof will not be passed by amplifier detector circuit 42 and hence no gain control bias signal will be supplied by circuit 42 to bandpass amplifier 26. In the absence of this gain control signal amplifier 26 will have a high overall gain.

Figure 2:
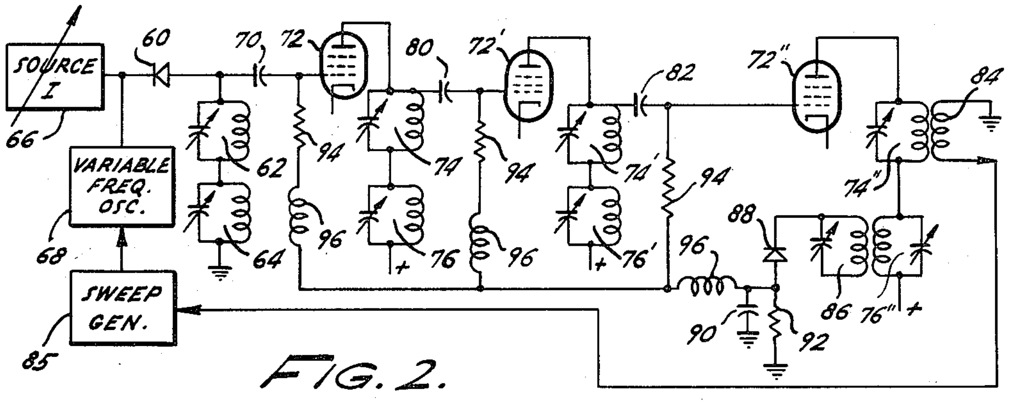
Fig. 2 is a schematic drawing of a second preferred embodiment of the invention.

Fig. 2 shows a second embodiment of the present invention. In Fig. 2 the balanced mixer 10 of Fig. 1 has been replaced by a single detector element 60 having two single tuned load impedances 62 and 64 associated therewith. Circuit 62, which comprises an inductor and capacitor in parallel, is tuned to the desired difference frequency. Circuit 64, which also comprises a capacitor and an inductor in parallel, is tuned to one-half the desired difference frequency. Mixer element 60 is supplied with signals from two sources 66 and 68 as before. Again these two sources operate at approximately the same frequency and at least one of the sources includes means for varying the operating frequency thereof over a comparatively wide range. The function of the circuit of Fig. 2 is to provide a control signal which will stop the frequency sweep of source 68 only at such times as the operating frequencies of the two sources 66 and 68 differ by a preselected amount. The signals appearing across the series combination of load impedances 62 and 64 are supplied by way of capacitor 70 to the control grid of an electron tube 72. Tube 72 forms a portion of the first stage of a bandpass amplifier circuit. The anode load impedance of tube 72 comprises two tuned circuits in series. Tuned circuit 74 is tuned to the desired difference frequency and tuned circuit 76 is tuned to one-half the desired difference frequency. Tubes 72' and 72'' form parts of successive amplifier stages which are similar in nature to the stages including tube 72. Tube 72' and tube 72'' are provided with load impedances 74' and 76' and 74'' and 76'', respectively, which correspond to load impedances 74 and 76 of the first stage of the amplifier. Capacitors 80 and 82 couple the first stage to the second stage and the second stage to the third stage, respectively. The circuit including electron tubes 72, 72' and 72'' is similar to a conventional bandpass amplifier circuit except that it has two passbands, one at the desired difference frequency and one at one-half the desired difference frequency. One output signal of the amplifier circuit is taken from winding 84 which is inductively coupled to the load impedance 74''. It will be remembered that this load impedance 74'' is tuned to the desired difference frequency. Therefore the signal appearing at output winding 84 will be at the desired difference frequency. The signal from winding 84 is supplied to sweep generator circuit 85 which may be similar to sweep generator 36 of Fig. 1. A parallel inductor-capacitor network circuit 86, which is tuned to one-half the desired difference frequency, is inductively coupled to load impedance 76'' which is tuned to this same frequency. The signal at half the desired difference frequency appearing across tuned circuit 86 is applied to a detector element 88 which has a load impedance made up of capacitor 90 and resistor 92 in parallel. It will be recognized that detector 88, capacitor 90 and resistor 92 form a means for providing a direct current signal which is proportional in amplitude to the amplitude of the one-half difference frequency signal appearing across tuned circuit 86. The D. C. signal appearing across capacitor 90 is supplied as a bias signal to the grids of tubes 72, 72' and 72''. Resistors 94 and inductors 96 again serve as decoupling networks which prevent feedback between the several stages of the bandpass amplifier circuit either at the desired difference frequency or at one-half the desired difference frequency.

The operation of the system of Fig. 2 is very similar to the operation of the circuit of Fig. 1. Owing to the bandpass nature of the amplifier circuit including electron tubes 72, 72' and 72'' no signal will appear at output winding 84 unless the operating frequencies of sources 66 and 68 differ by the desired difference frequency or a subharmonic of this desired difference frequency. If the sources 66 and 68 differ in their operating frequency by one-half the desired difference frequency, a signal at one-half the difference frequency will be developed across the load impedances 62 and 64 in series. The second harmonic of this one-half difference frequency will also be developed across the series combination of load impedances 62 and 64 since the frequency of this second harmonic signal will correspond to the frequency to which load impedance 62 is tuned. As stated before, in the circuits of prior art this second harmonic of the one-half difference frequency would appear as an output signal at winding 84 since it is equal in frequency to the desired difference frequency. However, in the circuit of Fig. 2 the one-half difference frequency signal appearing across load impedance 64 is amplified by the stages including tubes 72, 72' and 72'' and is supplied to detector circuit 88 by way of tuned circuit 86. The D. C. signal developed by detector element 88 in response to this one-half difference frequency signal will lower the gain of the three stages of the amplifier circuit. While it is true that decreasing the gain of these three stages will decrease the amplitude of the one-half difference frequency signal available for generating the bias, an equilibrium condition will be established in which the gain of the amplifier circuit is just sufficient to supply the necessary one-half difference frequency signal to maintain the gain of the amplifier at that level. The overall gain of the amplifier in the presence of this one-half difference frequency signal is considerably below the normal gain of the amplifier with no bias supplied to the control grids of the tubes in the amplifier chain. The reduction in gain caused by the one-half difference frequency signal will reduce the gain of the amplifier at the desired difference frequency. Therefore the bandpass amplifier will have relatively low gain for the second harmonic of the one-half difference frequency signal and this second harmonic will produce only a relatively small output signal at winding 84.

If sources 66 and 68 differ by the desired difference frequency, there is no longer any signal at one-half the desired frequency to provide a bias signal for the several stages of the amplifier circuit. Therefore all stages of the amplifier operate at a relatively high gain. The signal at the desired difference frequency appearing across load impedance 62 is amplified by the bandpass amplifier and appears as a relatively large amplitude signal at output winding 84.

Figure 3:
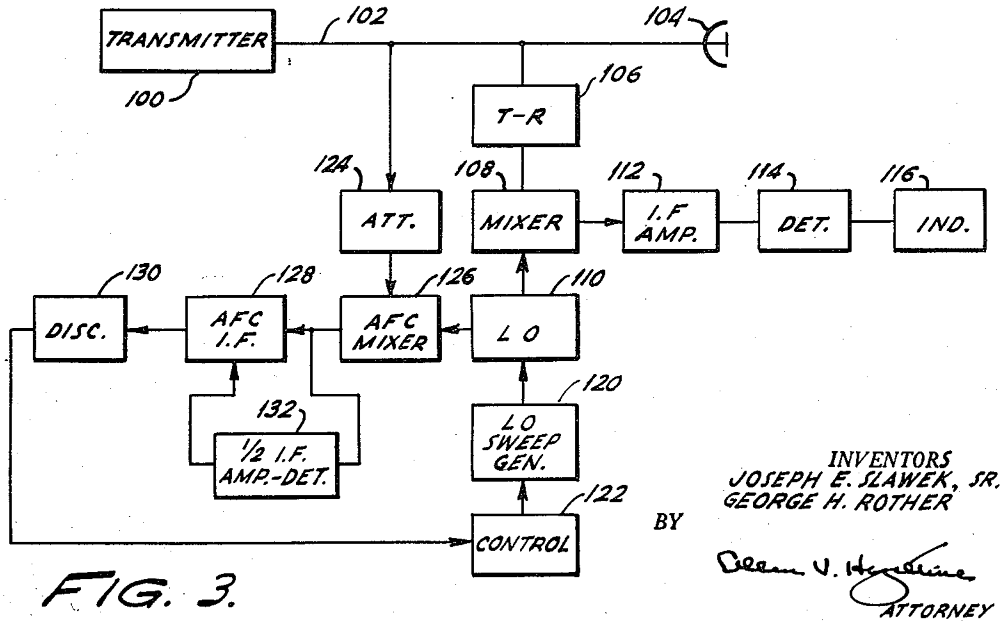
Fig. 3 is a block diagram of a radio object locating system embodying the present invention.

It should be obvious to those skilled in the art that the circuits of Figs. 1 and 2 may be put to a variety of uses. One such use has already been mentioned in the early part of the specification, namely in the automatic frequency control circuits of a radar system. Fig. 3 illustrates in block diagram how the circuits of Figs. 1 and 2 might be incorporated in a typical radar system. In Fig. 3 block 100 represents a transmitting oscillator of the type normally employed in radar systems. Transmitter 100 may include a tunable magnetron, the tuning of which may be varied either automatically or under the control of the radar operator. Transmitter 100 is connected by suitable waveguide 102 to an antenna 104. Antenna 104 is connected by way of transmit-receive device 106 to the signal mixer 108 of the radar system. Mixer 108 is also supplied with a signal from local oscillator 110. The heterodyne signals produced by mixer 108 are supplied by way of intermediate frequency amplifier 112 and detector 114 to an indicator 116 where they may be displayed or utilized in a conventional fashion.

The radar system shown in Fig. 3 also includes a circuit 120 for causing the local oscillator 110 to search in frequency. A circuit 112 is also provided for stopping this search when a local oscillator is at the desired frequency. The provision of circuits 120 and 122 makes it unnecessary for the operator to tune local oscillator 110 manually. Instead, as transmitter 100 is shifted in frequency, local oscillator 110 will search automatically until it reaches a frequency such that the frequency produced by mixer 108 is exactly equal to the intermediate frequency that will be accepted by amplifier 112. This is accomplished in the following manner. A sample of the transmitted signal is supplied by way of attenuator 124 to a separate mixer 126. This signal is a pulse modulated oscillatory signal. This mixer is usually referred to as the automatic frequency control mixer of the radar system. Since the frequency of the transmitted signal should be approximately equal to the frequency of the received echo signals, the beat frequency signals appearing at the output of mixer 126 will be approximately equal to the beat frequency signals appearing at the output of mixer 108 except for slight frequency shifts which may result if the echo signals are reflected from moving targets or are caused to be shifted in frequency for any other reason. The signals at the output of mixer 126 are supplied by way of an intermediate frequency amplifier 128 to a discriminator circuit 130. The crossover frequency of discriminator 130 is made equal to the desired intermediate frequency which will be passed by amplifier 112. This is also the intermediate frequency which will be passed by amplifier 128. The connections between discriminator 130 and control circuits 120 and 122 may take any one of several forms. In one typical frequency control system currently in use circuit 120 generates a voltage which increases linearly with time until a certain preselected potential is reached and then abruptly drops to a second lower potential, thereby generating what is known as a sawtooth voltage. This sawtooth voltage is supplied to a frequency control element of local oscillator 110 and causes the frequency of local oscillator 110 to change substantially linearly with time between a first frequency and a second frequency and then to return almost instantaneously to the first frequency. Control 122 is so arranged that it interrupts the sawtooth sweep produced by the circuit 120 upon the reception of an error signal of a particular polarity from discriminator 130. For example, if the signals supplied by amplifier 128 are slightly below the crossover frequency of discriminator 130, an error signal in the form of negative pulses may be supplied by discriminator 130 to control 122. This error signal may have no effect on control 122. However, as the frequency of the signal supplied by amplifier 128 rises to a value above the crossover frequency, the error signal supplied by discriminator 130 will change to a series of positive pulses. These positive pulse signals will then act through control 122 to interrupt the sweep of the signal generated by circuit 120. As stated before, frequency control circuits operating in this manner have been in use for a number of years and therefore require no detailed description. The amplifier detector circuit of the present invention, which operates at one-half the frequency of amplifiers 112 and 128, is represented by block 132. Amplifier detector circuit 132 receives its input signal from the output of mixer 126 and supplies a gain control bias signal to one or more stages in amplifier circuit 128.

It is believed that the operation of the system of Fig. 3 should be obvious from the description of the operation of the systems of Figs. 1 and 2 given above. When the radar system is first put into operation, transmitter 10 operates at a frequency determined by the radar operator or by the automatic circuits controlling the frequency of the transmitter. Local oscillator 110 will search in frequency until it reaches a frequency separated from the transmitted frequency by the desired intermediate frequency signal. At this frequency a signal will be supplied by mixer 126 to intermediate frequency amplifier 128 and from this circuit to the discriminator 130. Discriminator 130, acting through control circuits 122, will stop the sweep of the local oscillator at the desired frequency. Thereafter error signals generated by discriminator 130, acting through control circuit 122, will maintain local oscillator 110 at the desired frequency. If the frequency of transmitter element 110 is changed by a small amount, the automatic frequency control circuit may also shift the frequency of local oscillator 110 by the same small amount. If the frequency of transmitter 110 is changed abruptly by an appreciable amount, local oscillator 110 may again resume its search until the desired local oscillator frequency is reached. When this frequency is reached the automatic frequency control loop will again stabilize the local oscillator frequency at the appropriate value. Amplifier 132 acts to prevent the sweep of the local oscillator from being interrupted at a frequency difference equal to one-half the desired frequency difference.

While the invention has been described with reference to the preferred embodiments thereof, it will be apparent that various modifications and other embodiments thereof will occur to those skilled in the art within the scope of the invention. Accordingly we desire the scope of our invention to be limited only by the appended claims.

What is claimed is:

1. In combination with a source of oscillatory signal and an oscillator, a frequency control system comprising means associated with said oscillator for causing said oscillator to sweep in frequency over a selected band in the absence of a control signal of a preselected frequency and to remain fixed in frequency in response to a control signal of said preselected frequency, a heterodyne mixer circuit, means for supplying a signal from said source and a signal from said oscillator to said heterodyne mixer circuit, signal transfer means having two restricted passbands, one of said passbands including a frequency equal to said preselected frequency, the other of said passbands including a frequency equal to one-half said preselected frequency, said signal transfer means connecting said mixer circuit to said means for controlling the frequency of said oscillator, gain control means associated with said signal transfer means for altering the signal transfer characteristic of said signal transfer means at said preselected frequency in response to a signal at one-half said preselected frequency supplied to an input of said gain control means, and means connecting the output of said signal transfer means to said input of said gain control means.

2. In combination with a source of oscillatory signal and an oscillator, a frequency control system comprising means associated with said oscillator for causing said oscillator to sweep in frequency over a selected band and to remain fixed in frequency in response to a control signal of said preselected frequency, a heterodyne mixer circuit, means for supplying a signal from said source and a signal from said oscillator to said heterodyne mixer circuit, a bandpass amplifier means having two restricted passbands, one of said passbands including a frequency equal to said preselected frequency, and the other of said passbands including a frequency equal to one-half said preselected frequency, said amplifier means connecting said mixer circuit to said means for controlling the frequency of said oscillator, gain control means associated with said amplifier means for reducing the gain of said amplifier means at said preselected frequency in response to a signal at one-half of said preselected frequency supplied to an input of said gain control means, and means connecting the output of said amplifier means to said input of said gain control means.

3. In combination with a source of oscillatory signal and an oscillator, a frequency control system comprising means associated with said oscillator for causing said oscillator to sweep in frequency over a selected band in the absence of a control signal of a preselected frequency and to remain fixed in frequency in response to a control signal of said preselected frequency, a heterodyne mixer circuit, means for supplying a signal from said source and a signal from said oscillator to said heterodyne mixer circuit, a first bandpass circuit connecting said mixer to said frequency control means, the mid-frequency of the passband of said first bandpass circuit being substantially equal to said preselected frequency, signal responsive means associated with said first bandpass circuit for rendering said first bandpass inoperative to pass a signal, and a second bandpass circuit connecting said heterodyne mixer to said last-mentioned means, the mid-frequency of said second bandpass circuit being substantially one-half said preselected frequency.

4. In combination with a source of oscillatory signal and an oscillator, a frequency control system comprising means associated with said oscillator for causing said oscillator to sweep in frequency over a selected band in the absence of control signal of a preselected frequency and to remain fixed in frequency in response to a control signal of said preselected frequency, a heterodyne mixer circuit, means for supplying a signal from said source and a signal from said oscillator to said heterodyne mixer circuit, a bandpass amplifier connecting said mixer to said frequency control means, the passband of said amplifier including said preselected frequency, means for reducing the gain of said amplifier in response to a signal having a frequency equal to one-half said preselected frequency, and a bandpass circuit connecting said mixer to said gain control means, the passband of said bandpass circuit including a frequency equal to one-half said preselected frequency.

5. In combination with a source of oscillatory signal and an oscillator, a frequency control system comprising means associated with said oscillator for causing said oscillator to sweep in frequency over a selected band and to remain fixed in frequency in response to a control signal of said preselected frequency, a heterodyne mixer circuit, means for supplying a signal from said source and a signal from said oscillator to said heterodyne mixer circuit, an amplifier circuit including at least one stage having greater response at approximately said preselected frequency and at approximately one-half said preselected frequency than at other frequencies, said amplifier circuit connecting said mixer circuit to said means for controlling the frequency of said oscillator, gain control means associated with said amplifier circuit for reducing the gain thereof in response to a signal supplied to said gain control means, and means responsive only to signals at one-half said preselected frequency connecting the output of said amplifier to said gain control means.

6. In combination with a source of oscillatory signal and an oscillator, a frequency control system comprising means associated with said oscillator for causing said oscillator to sweep in frequency over a selected band and to remain fixed in frequency in response to a control signal of said preselected frequency, a heterodyne mixer circuit, means for supplying a signal from said source and a signal from said oscillator to said heterodyne mixer circuit, an amplifier circuit including at least one stage having greater response at approximately said preselected frequency and at approximately one-half said preselected frequency than at other frequencies, said amplifier including at least one stage having a variable gain which is a function of a bias signal supplied thereto, said amplifier circuit connecting said mixer circuit to said means for controlling the frequency of said oscillator, means associated with the output of said amplifier for providing a direct current signal proportional in amplitude to the amplitude of the signal at one-half said preselected frequency appearing at the output of said amplifier circuit, and means connecting said last-mentioned means to said variable gain stage whereby said direct current signal is supplied as a bias signal to said stage.

7. A bandpass amplifier system having an overall gain at one frequency which is a function of the subharmonic content of the signal to be amplified, said system comprising amplifier means having greater response at approximately a preselected frequency and at approximately a selected subharmonic of said preselected frequency than at other frequencies, means for supplying the signal to be amplified to the input of said amplifier means, gain control means associated with said amplifier means for controlling the gain thereof at least at said preselected frequency, and means connecting the output circuit of said amplifier to said gain control means, said connecting means being non-responsive to signals at said preselected frequency.

8. A bandpass amplifier system having an overall gain which is a function of the subharmonic content of the signal to be amplified, said amplifier system comprising an amplifier circuit including at least one amplifier stage having greater response at a preselected frequency and at a selected subharmonic of said preselected frequency than at other frequencies, and at least one amplifier stage having a variable gain, means for supplying the signal to be amplified to the input of said amplifier circuit, gain control means associated with said variable gain stage for altering the gain thereof in response to a signal supplied to said gain control means, and means connecting the output of said amplifier circuit to said gain control means, said connecting means being responsive only to signals at said selected subharmonic frequency derived from said signal to be amplified.

9. A bandpass amplifier system having an overall gain which is a function of the subharmonic content of a signal to be amplified, said amplifier system comprising an amplifier circuit including at least one amplifier stage having greater response at a preselected frequency and at approximately one-half said preselected frequency than at other frequencies, and at least one amplifier stage having a variable gain, means for supplying the signal to be amplified to the input of said amplifier circuit, gain control means associated with said variable gain stage for altering the gain thereof in response to a signal supplied to said gain control means, and means connecting the output of said amplifier circuit to said gain control means, said connecting means being responsive only to signals at one-half said preselected frequency derived from said signal to be amplified.

10. In combination with a source of oscillatory signal and an oscillator, a frequency control system comprising means associated with said oscillator for causing said oscillator to sweep in frequency over a selected band and to remain fixed in frequency in response to a control signal of said preselected frequency, a heterodyne mixer circuit, means for supplying a signal from said source and a signal from said oscillator to said heterodyne mixer circuit, and a bandpass amplifier system connecting said heterodyne mixer circuit to said means for controlling the frequency of said oscillator, said bandpass amplifier system having an overall gain at approximately said preselected frequency which is a function of the subharmonic content of the signal at the output of said heterodyne mixer, the gain of said amplifier system being lower in the presence of a signal at the output of said mixer having a frequency equal to one-half said preselected frequency than it is in the absence of such a signal.

11. A bandpass amplifier system having an over-all gain which is a function of the subharmonic content of the signal to be amplified, said amplifier system comprising an amplifier circuit having first and second signal channels, said first signal channel being adapted to pass signals at a preselected frequency and said second signal channel being adapted to pass signals at a selected subharmonic of said preselected frequency, means for supplying the signal to be amplified to the input of both of said channels, signal responsive gain control means associated with said amplifier means for controlling the gain of at least said first channel, and means connecting the output circuit of said second channel to said gain control means whereby said gain control means is responsive to signals at said selected subharmonic frequency derived from the signal to be amplified.

12. In combination with a source of oscillatory signal and an oscillator, a frequency control system comprising means associated with said oscillator for causing said oscillator to sweep in frequency over a selected band and to remain fixed in frequency in response to a control signal of a preselected frequency, a heterodyne mixer circuit, means for supplying a signal from said source and a signal from said oscillator to said heterodyne mixer circuit, a bandpass amplifier means having two restricted passbands, one of said passbands including a frequency equal to said selected frequency and the other of said passbands including a frequency equal to a selected subharmonic of said preselected frequency, said amplifier means connecting said mixer circuit to said means for controlling the frequency of said oscillator, gain control means associated with said amplifier means for reducing the gain of said amplifier means at said preselected frequency in response to a signal at said selected subharmonic of said preselected frequency supplied to the input of said gain control means, and means connecting the output of said amplifier means to said input of said gain control means.

References Cited in the file of this patent

UNITED STATES PATENTS

| | | |
|---|---|---|
| 2,477,028 | Wilkie | July 26, 1949 |
| 2,503,787 | Westerveld | Apr. 11, 1950 |
| 2,531,845 | Gall | Nov. 28, 1950 |
| 2,713,122 | Henley | July 12, 1955 |

UNITED STATES PATENT OFFICE

CERTIFICATE OF CORRECTION

Patent No. 2,848,615 August 19, 1958

George H. Rother et al

It is hereby certified that error appears in the printed specification of the above numbered patent requiring correction and that the said Letters Patent should read as corrected below.

Column 1, line 63, for "charged" read -- changed --; column 5, line 39, for "sperated" read -- separated --; column 7, line 46, for "circuit 112" read -- circuit 122 --.

Signed and sealed this 29th day of March 1960.

(SEAL)

Attest:

KARL H. AXLINE

Attesting Officer

ROBERT C. WATSON

Commissioner of Patents